United States Patent [19]

Sprague

[11] Patent Number: 4,837,590
[45] Date of Patent: Jun. 6, 1989

[54] PORTABLE COMPUTER AND CARRYING CASE FOR MOBILE OFFICE

[76] Inventor: Glenn R. Sprague, 33935 Nine Mile Rd., Farmington Hills, Mich. 48024

[21] Appl. No.: 189,860

[22] Filed: May 3, 1988

[51] Int. Cl.⁴ .............................................. G01D 15/00
[52] U.S. Cl. .................................... 346/145; 206/305; 206/232; 206/320; 206/576; D16/106; D3/76; 190/900; 190/109; 400/685
[58] Field of Search ............... 190/900, 100, 108, 109, 190/111; 312/208; 400/685; 346/145; 206/320, 576, 232, 305; D14/106, 100; D3/76, 74, 30.1; 364/708

[56] References Cited

U.S. PATENT DOCUMENTS

| | | | |
|---|---|---|---|
| 4,658,298 | 4/1987 | Takeda et al. | 206/320 |
| 4,669,053 | 5/1987 | Krenz | D14/106 |

Primary Examiner—Joseph W. Hartary
Assistant Examiner—Huan H. Tran
Attorney, Agent, or Firm—Dykema Gossett; Robert A. Sloman

[57] ABSTRACT

A mobile office comprises a carrying case having a hollow rectangular base and a hollow cover hingedly connected thereto; with a first platform positioned within the base and anchored therein. A lap-top computer is mounted upon and anchored to the first platform adapted for connection to an electric power source and includes a video display screen normally enclosed within the profile of the cover when closed and pivotal to an upright use position when the cover is open. A second platform is positioned within the base and anchored therein and spaced from the bottom of the base defining a paper storage chamber. An electronic pointer is mounted upon and anchored to the second platform and connected to the computer. A stack of tractor feed manifold paper is positioned within the storage chamber with its lead edge threaded into the printer. The cover includes a storage chamber for a multiple chamber collapsible manifold and a second chamber with cover to mount and close a cellular telephone and modem.

11 Claims, 2 Drawing Sheets

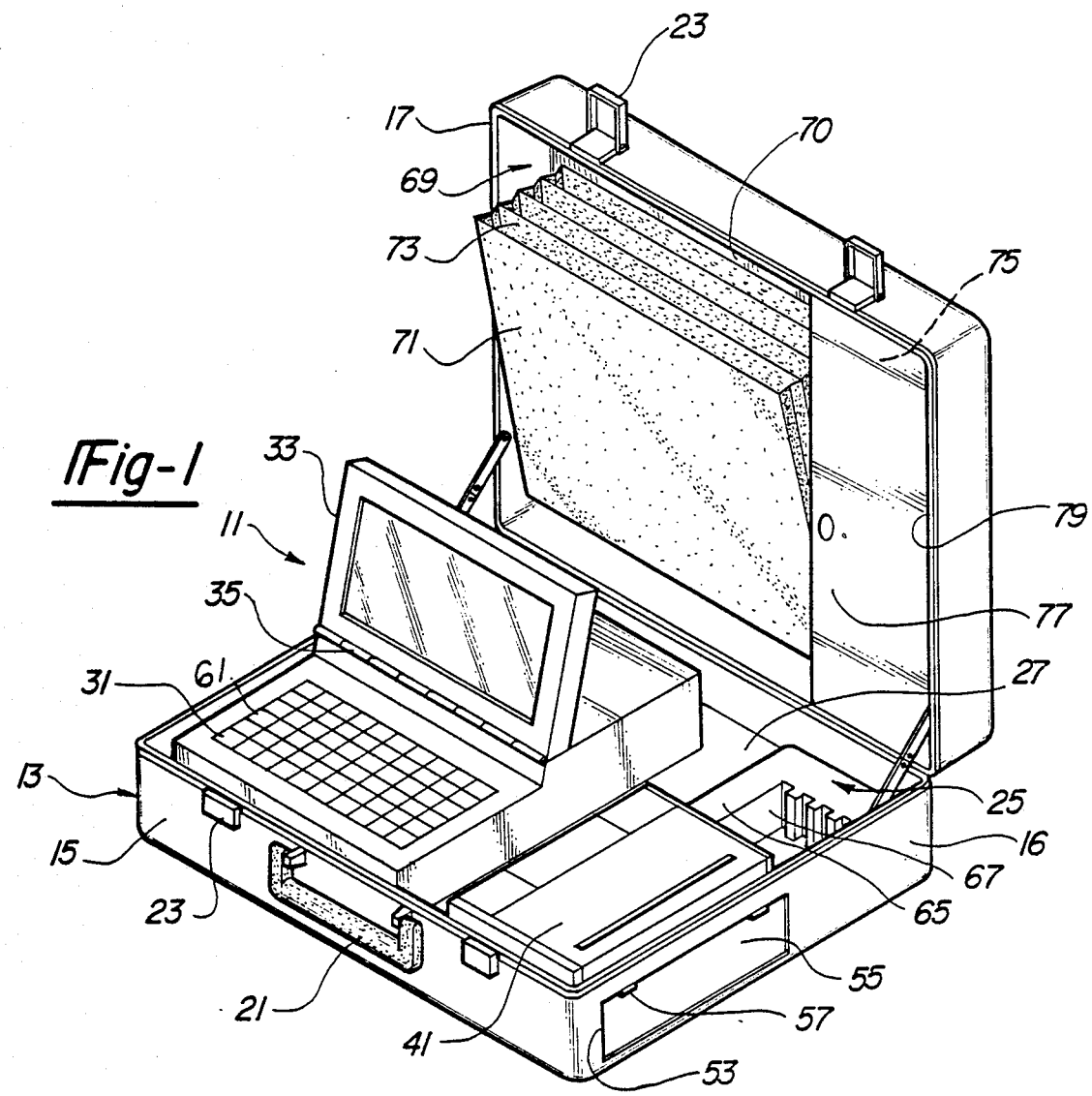

PORTABLE COMPUTER AND CARRYING CASE FOR MOBILE OFFICE

FIELD OF THE INVENTION

The invention relates to a portable computer and more particularly to a carrying case therefore with multiple compartments which house equipment used with the computer including a printer and tractor feed manifold paper and additional storage compartments.

BACKGROUND OF THE INVENTION

Previously it is known to provide computers or lap-type computers which are portable and can be transported in a carrying case. Portability of such computers is an advantage to sale agents and people engaged in travel and business. The difficulty however, is that a computer while providing for instantaneous input as desired successively and from time to time in accordance with a pre-determined program does not provide the other facilities so that full usage could be achieved namely the separate uses of a computer electronically connected with a printer together with the storage of a stack of tractor feed manifold paper to be fed into the printer.

There is a need particularly for salesmen or insurance people of a lap-top computer provided in a carrying case which has sufficient additional storage chambers such as would house and mount therein a printer connected to the computer together with a supply of paper directly fed to the printer together with additional compartments such as could be used for files, pens, note paper, floppy discs, order sheets, letter head, envelopes, and the like.

There is a need furthermore for, a portable computer within a carrying case and a support means for anchoring the computer therein together with additional compartments which will enclose a printer anchored within the carrying case and a storage chamber providing for stacking tractor feed manifold paper continuously connected to the printer and additional compartments for floppy discs used in conjunction with the computer, provision for an electrical power source and with additional storage compartments.

PRIOR ART

Portable compartmented containers, and carrying cases for electronic equipment and including carrying cases for computers are shown in one or more of the following U.S. Patents

| U.S. Pat. No. | Inventor | Date |
| --- | --- | --- |
| 4,168,870 | Hames A. Hill | September 25, 1979 |
| 4,291,198 | Robert V. Anderson et al. | September 22, 1981 |
| 4,471,409 | Clifford Dittrich | September 11, 1984 |
| 4,527,285 | Dennis H. Kekas et al. | July 2, 1985 |
| 4,571,456 | David C. Paulsen et al. | February 18, 1986 |

SUMMARY OF THE INVENTION

An important feature of the present invention is to provide for a mobile office which comprises a carrying case having a hollow rectangular base and a hollow cover hingedly connected thereto which stores a lap-top computer having a pivotal video display screen, further stores an electronic printer connected to the computer, includes an electrical power source for the computer and further provides for storage of a stack of tractor feed manifold paper for feeding into the printer.

Another feature is to provide a portable computer which includes a carrying case therefore which is oversized and which houses, mounts and anchors therein a lap-top computer, an electronic printer connected thereto, a stack of tractor feed manifold paper positioned within a separate storage compartment for continuously feeding manifold paper to the printer, a storage chamber for floppy discs and within the cover additional compartments adapted to receive a storage manifold having a plurality of storage chambers into which may be separately enclosed for convenience, files, paper, office supplies, letter heads, envelopes, note paper, pencils and pens and the like.

As another feature there is provided an additional chamber within the cover having a closure therefor within which is mounted and supported a cellular mobile phone and modem.

As an important feature the present mobile office includes for the carrying case first and second platforms positioned within the base thereof and anchored thereto upon which are respectively mounted and anchored a lap-top computer and electronic printer connected to the computer, wherein one platform is spaced above the bottom of the carrying case providing a chamber for the storage of tractor feed manifold paper for feeding into the printer.

As another feature, the one platform which mounts the computer is spaced from the bottom of the carrying case to define a power chamber within which an electric power source may be housed including a battery or other connections for an exterior power source for connection to the computer.

These and other objects and features will be seen from the following specification and claims in conjunction with the appended drawings.

THE DRAWINGS

FIG. 1 is a front perspective view of the present mobile office with the carrying case shown open and the computer in a use position elevated video display screen.

FIG. 2 is a front elevational view of the mobile office and carrying case in a non-use storage condition for portability, partly broken away and sectioned for clarity of illustration.

It will be understood that the above drawings illustrate merely a preferred embodiment of the invention, and that other embodiments are contemplated within the scope of the claims hereafter set forth.

DETAILED DESCRIPTION OF THE EMBODIMENT OF THE INVENTION

Figure 3:
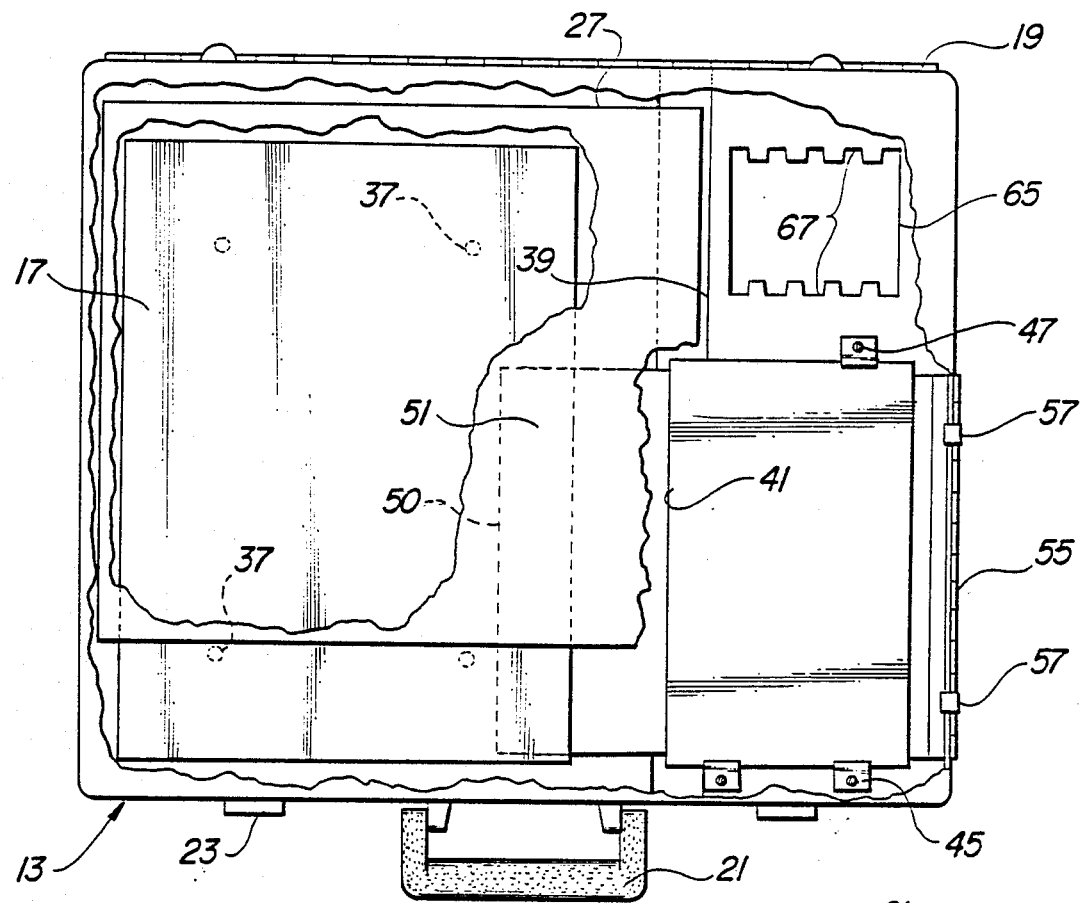
FIG. 3 is a plan view thereof, partly broken away and sectioned.
Figure 4:
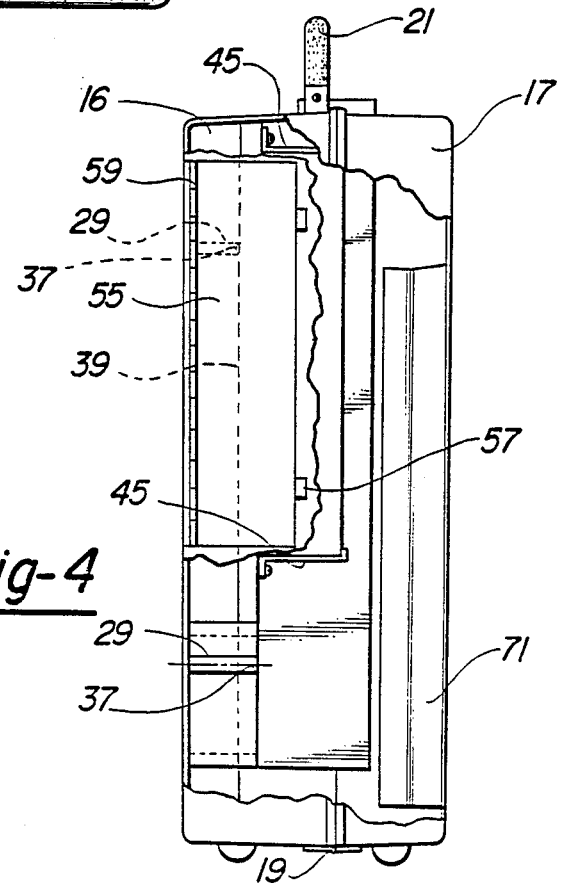
FIG. 4 is a right side elevational view thereof partly broken away and sectioned.

Referring to the drawings FIGS. 1-4 the present mobile office is generally indicated at 11 and is essentially directed to a carrying case 13 which may be a camera case having a hollow base 15 including a pair of upright end wall 16 and a cover 17 hinged thereto at 19, FIG. 3. Pivotal handle 21 upon base 15 facilitates transport of the closed carrying case when the fasteners 23 on cover 17 and base 15 are latched together, FIG. 2.

Positioned within the base 15 in the chamber 25 is a first platform 27 of rectangular shape, FIGS. 1 and 3, mounted upon a plurality of spacer supports 29, FIG. 2. Forming a part of the mobile office and housed within the base 15 is a lap-top computer 31 which is schematically shown in FIG. 1 and which includes a video display screen 33 of a conventional construction pivoted to the computer base as at 35, FIG. 1. The computer is secured to platform 27 by a plurality of screw fasteners 37.

A second platform 39 is positioned within chamber 25 of base 15 and is elevated a limited distance with respect to the first platform 27 and spaced from the bottom wall of the base 15 defining a manifold paper storage compartment 43, FIG. 2.

Electronic printer 41 compatible with the lap-top computer 31 and electrically connected thereto is mounted upon the second platform 39 and secured thereto by a plurality of hold-down clamps 45, FIGS. 2 and 3, which engage opposite side edges of the printer. The clamps are secured by fasteners 47 to the second platform 39. A stack of tractor feed manifold paper 49 is nested within the paper storage box 50 which is positioned within chamber 43 so to underlie the printer 41.

In order to accommodate the manifold type of tractor feed paper 49 in a stack, there is arranged across the inner end of the paper storage box 50 an upwardly and transversely arcuate dome guide 51 to facilitate the reverse unfolding of the successive folds of manifold paper 49. Across the forward edge of the paper storage box 50 and extending thereabove is a reverse curved transverse feed guide 52 for guiding the lead sheet of tractor feed paper into the printer 41, FIG. 2.

Formed within one of the side walls 16 of the base 15 there is provided an elongated access slot 53 which is normally closed by the elongated door 55, FIG. 2. The access slot 53 is useful in facilitating the initial feeding of the manifold paper into printer 41. Alternately the manifold paper may be stacked upon a table or desk on the exterior of the case and fed directly to the printer through the side wall access opening 53.

The door 55 is hinged to side wall 16 as by the hinges 59 FIG. 2 and includes at its upper edge a pair of handles 57 to facilitate opening of the access door. Though not shown in the illustrative embodiment, the door 55 may be spring biased to the upright closed position, FIG. 1.

The corresponding second platform 39 is positioned within chamber 25 of the base 15 of the carrying case and is mounted upon paper holder 50. Computer 31 has a conventional keyboard 61.

Arranged laterally of printer 41 and nested down within second platform 39 is a floppy disc storage device 65 which includes a series of laterally spaced opposed slotted portions 67 adapted to receive a plurality of floppy discs, not shown, adapted for use with conjunction with the operation of the computer.

Forming a part of the present carrying case and adapted for use in conjunction with the present mobile office 11 there is provided within cover 17 a storage chamber 69 an elongated rectangular storage manifold 71 which along its inner surface is suitably anchored as at 70 to the interior of cover 17 corresponding to the top wall thereof.

The present storage manifold 71 includes a plurality of storage chambers 73. These chambers are adapted for the selected storage of files, paper, office supplies including envelopes, stationary, letter heads, note paper, pencils and pens and so forth for the convenience of the user of the mobile office.

The storage manifold 71 is expandable and opens out to the forwardly and outwardly inclined position shown in FIG. 1. When the cover is closed down over the computer 31, and wherein the screen 33 has been rotated to a horizontal position, the storage manifold is fully within the profile of cover 17 as is also a portion of the video screen.

Also provided within the cover 17 is an additional cover chamber 75 having a closure 77 hinged thereto at 79 adapted to enclose and to store and mount therein a cellular mobile telephone and associated phone modem for storage within the carrying case when closed and for full portability.

The first platform 29, FIG. 2, is spaced above the bottom wall of base 15 to define power chamber 80 within which is nested power source 81, which in the illustrative embodiment is a rechargeable battery or an AC power source which includes a plug connection 83 mounted in the base 15, adapted for connection to an exterior electrical power source for energizing the computer and printer or for recharging the battery. A plurality of battery anchor clips 85 within chamber 80 are adapted to anchor and hold down the power source or battery 81 beneath the first platform 29.

The present carrying case 13 with lap top computer 31, printer 41 and tractor feed manifold paper 49 comprises unit which can be used on the road for sales, for quoting, estimating, testing, for reports, ordering of goods, office communications, printing invoices on the spot or contracts and so forth. The possibilities are endless in providing with the carrying case for the present portable computer sufficient facility for the storage of such useful cooperating apparatus in conjunction with the computer such as the printer 41 and the manifold paper 49 and storage 65 for the floppy discs used with the computer as to render the present mobile office a most useful device particularly for salesmen though not limited thereto.

Having described my invention, reference should now be had to the following claims.

I claim:

1. A mobile office comprising a carrying case having a hollow rectangular base and a hollow cover hingedly connected thereto;

a rectangular first platform positioned within a first portion of said base and anchored therein;

a lap-top computer mounted upon and anchored to said first platform adapted for connection to an electric power source;

said computer including a horizontal video display screen hinged thereto, normally enclosed within the profile of said cover when closed and pivotal to an upright use position when said cover is open;

a rectangular second platform arranged laterally of and elevated relative to said first platform, positioned within a second portion of said base and anchored therein;

said second platform being spaced from the bottom of said base defining a paper storage chamber below said second platform;

an electronic printer mounted upon and anchored to said second platform and connected to said computer; and a stack of tractor feed manifold paper within said storage chamber with its lead edge threaded into said printer.

2. In the mobile office of claim 1, said first platform being spaced from the bottom of said base defining a power chamber below said first platform;
   said electric power source including a rechargeable battery mounted within said power chamber, connected to said computer and selectively adapted for connection to an exterior power supply.

3. In the mobile office of claim 1, the anchoring of said computer including a plurality of fasteners extending through said first platform and threaded into said computer.

4. In the mobile office of claim 1, the anchoring of said printer including a plurality of upright hold-down clamps secured to said second platform and retainingly engaging opposite side portions of said printer.

5. In the mobile office of claim 1, the mounting of said manifold paper including an elongated storage box nested within said paper storage chamber, receiving and enclosing said stack of tractor feed manifold paper;
   a transverse upwardly concave dome guide at and across the inner end of said storage box providing clearance for the manifold paper as it rolled longitudinally forward; and
   a transverse reverse-curved paper guide means across the outer end of said box for continuously guiding said paper to said printer.

6. In the mobile office of claim 1, said computer extending laterally of the length of said base, said printer extending transversely thereof.

7. In the mobile office of claim 1, said base including a pair of end walls;
   one end wall having an elongated paper access slot therethrough along and adjacent said printer; and
   a manually openable door hinged to said one end wall normally closing said access slot.

8. In the mobile office of claim 1, a floppy disk storage device mounted upon said second platform adjacent one end of the printer and including a plurality of laterally spaced opposed slotted portions for receiving and holding a plurality of floppy disks.

9. In the mobile office of claim 1, said cover including first and second cover storage chambers; and
   an elongated storage manifold including a plurality of elongated upwardly opening storage spacers, positioned within said first cover chamber, with its rear surface to the interior of said cover and with its outer surface inclined forwardly when the cover is open, opening the intermediate storage spacers, said storage manifold being enclosed within the profile of said cover when it is closed.

10. In the mobile office of claim 9, said second cover chamber including a hinged cover, adapted to mount and enlose a cellular telephone and modem.

11. In the mobile office of claim 1, said cover including a cover storage chamber, including a hinge cover, adapted to mount and enclose a cellular telephone and modem.

* * * * *